US008797181B2

(12) United States Patent
Leopold et al.

(10) Patent No.: US 8,797,181 B2
(45) Date of Patent: Aug. 5, 2014

(54) CONTROL DEVICES AND METHODS FOR A ROAD TOLL SYSTEM

(71) Applicant: Kapsch TrafficCom AG, Vienna (AT)

(72) Inventors: Alexander Leopold, Vienna (AT); Oliver Nagy, Vienna (AT)

(73) Assignee: Kapsch TrafficCom AG (AT)

(*) Notice: Subject to any disclaimer, the term of this patent is extended or adjusted under 35 U.S.C. 154(b) by 0 days.

(21) Appl. No.: 13/757,556

(22) Filed: Feb. 1, 2013

(65) Prior Publication Data

US 2013/0201034 A1 Aug. 8, 2013

(30) Foreign Application Priority Data

Feb. 2, 2012 (EP) .................................... 12153658

(51) Int. Cl.

| | |
|---|---|
| ***G08G 1/00*** | (2006.01) |
| ***G08G 1/017*** | (2006.01) |
| *G07B 15/06* | (2011.01) |

(52) U.S. Cl.

CPC .......... *C08G 1/096791* (2013.01); *G07B 15/06* (2013.01); *G08G 1/017* (2013.01); *G07B 15/063* (2013.01); *G08G 1/205* (2013.01)

USPC ........ 340/902; 340/928; 340/988; 340/425.5; 340/539.1; 701/117

(58) Field of Classification Search

CPC ........... G08G 1/017; G08G 1/07; G08G 1/01; G08G 1/0967; G08G 1/096791; G08G 1/0965; G08G 1/205; G07B 15/063; G07B 15/06; G07B 15/00

USPC ................. 340/902, 905, 928, 936, 988, 989, 340/425.5, 438, 539.1, 992, 539.13; 701/32.3, 32.4, 117

See application file for complete search history.

(56) References Cited

U.S. PATENT DOCUMENTS

| | | | | |
|---|---|---|---|---|
| 6,937,162 | B2 * | 8/2005 | Tokitsu et al. | 340/928 |
| 7,324,017 | B2 * | 1/2008 | Hartinger | 340/989 |
| 7,818,204 | B2 * | 10/2010 | Solomon | 705/13 |
| 7,869,940 | B2 * | 1/2011 | Dare | 701/468 |
| 8,384,560 | B2 * | 2/2013 | Malarky | 340/928 |

FOREIGN PATENT DOCUMENTS

| | | |
|---|---|---|
| DE | 102005050397 | 4/2007 |
| EP | 1708143 | 10/2006 |
| WO | 2011129800 | 10/2011 |

OTHER PUBLICATIONS

Extended European Search Report dated Jul. 20, 2012 from the European Patent Office.

* cited by examiner

*Primary Examiner* — Anh V La

(74) *Attorney, Agent, or Firm* — Invention Mine LLC

(57) ABSTRACT

Control devices and methods for a road toll system that is based on on-board units carried by vehicles, comprising: in a marking vehicle detecting a traffic or toll violation of an on-board unit, and, if a violation exists, transmitting a marker to the on-board unit via a DSRC radio interface; in an on-board unit periodically determining, upon receipt of a marker, the position of the unit and broadcasting a position message containing the respective current position; and in the control unit: detecting the vehicle based on at least one of the position messages that are broadcast by the on-board unit.

23 Claims, 7 Drawing Sheets

CONTROL DEVICES AND METHODS FOR A ROAD TOLL SYSTEM

CROSS REFERENCE TO RELATED APPLICATIONS

The present application claims the priority of the European patent application no. 12153658.5 filed on Feb. 2, 2012, which is hereby incorporated herein by reference.

FIELD OF THE INVENTION

Described herein are devices and methods for a road toll system that is based on on-board units carried by vehicles.

BACKGROUND

In modern road toll systems, vehicles subject to tolls are equipped with on-board units (OBUs), which can be used to locate the vehicles so as to then charge tolls (fees) for their usage of the road. The OBUs can take on a variety of designs: The OBUs can be of the "self-locating" type, which is to say, they can continually determine the locations thereof themselves, for example by means of a satellite navigation receiver as part of a satellite navigation system (global navigation satellite system, GNSS) and report the locations thus determined ("position fixes") either directly to a back office of the road toll system, be it via a mobile communication network or a network of geographically distributed radio beacons, or in the form of "abstracted" toll transactions, which are calculated based on the reported positions. As an alternative, such GNSS OBUs could simply store the reported positions or toll transactions thereof, or debit the fees calculated based thereon from an internal toll credit account. The OBUs can also be of the "externally located" type, for example using a plurality of toll or radio beacons which are geographically distributed over the road toll system and which establish the respective short range communication or DSRC (dedicated short range communication) with passing OBUs and localize them with respect to the known beacon locations thereof due to the limited communication range. Corresponding reported positions, or toll transactions calculated based thereon, can then be generated by the OBUs or the toll beacons and processed either in the OBUs or in the back office.

SUMMARY

Various embodiments described herein are directed to control devices and methods for ascertaining and enforcing traffic or toll violations in such road toll systems.

Some embodiments include a control device of the type mentioned above, comprising: at least one marking vehicle, at least one on-board unit, and at least one control unit, each comprising a DSRC transceiver for establishing a DSRC radio interface, wherein the marking vehicle is configured to detect a traffic or toll violation of an on-board unit, or of a vehicle carrying the same, and, if a violation exists, to transmit a marker to the on-board unit via the DSRC radio interface, wherein the on-board unit is configured to determine the position thereof and, upon receipt of a marker, to periodically broadcast position messages containing the respective current position thereof, and wherein the control unit is configured to detect the vehicle based on at least one of the position messages broadcast by the on-board unit.

A further embodiment includes an on-board unit for a road toll system, comprising a unit for determining the on-board unit's position and a DSRC transceiver for establishing a DSRC radio interface, which is configured to periodically broadcast position messages containing the respective current position thereof upon receipt of a marker in the DSRC transceiver.

Further embodiments include a control method for a road toll system that is based on on-board units carried by vehicles, using at least one marking vehicle, at least one on-board unit and at least one control unit, each comprising a DSRC transceiver for establishing a DSRC radio interface, the method comprising: in the marking vehicle: detecting a traffic or toll violation of an on-board unit, or of a vehicle carrying the same, and, if a violation exists, transmitting a marker to the on-board unit via the DSRC radio interface; in the on-board unit: periodically determining the unit's own position upon receipt of a marker and broadcasting position messages containing the respective current position thereof; in the control unit: detecting the vehicle based on at least one of the position messages broadcast by the on-board unit.

Various embodiments described herein use a distributed control system, which comprises a first fleet of marking vehicles ("hunters"), which electronically "mark" violating vehicles, and a second fleet of control units ("catchers"), which pick up violating vehicles thus marked. The "hunters" are well-equipped for automatic violation detection and in some embodiments are not required to take any further action for violating vehicles than that of marking the same; their interactions with the controlled vehicles are brief, and consequently they can move about quickly and even check vehicles traveling at high speed or in opposing traffic, and their number can be kept low, whereby the overall equipment costs are contained. The on-board units may be equipped with little additional functionality so as to wirelessly identify themselves, quasi on their own, as an OBU of a "marked" violating vehicle. The "catchers" may include comparatively little equipment because they do not ascertain violations, but only detect emissions of marked OBUs and thus track down violating vehicles. The crew of the control unit can then, for example, stop the violating vehicle and conduct a local manual check. Because of the low equipment requirements, control units (catchers) can be provided in large numbers and can thus also specifically conduct time-consuming local inspections. For example, existing infrastructure installations such as border or toll stations, fleets of special-purpose vehicles such as emergency vehicles, means of public transportation, taxis and the like, can be converted into control units and perform the control functions thereof in stationary fashion or in mobile fashion, in stopped traffic or moving traffic, while a few complex recording vehicles (hunters) continually move through moving traffic in a highly mobile fashion and mark violating OBUs. As a result, automatic controls of vehicles, including the on-board units thereof, can be carried out even in large, broadly branched road systems that contain high-speed and opposing traffic routes.

The devices and methods described herein are suited both for (DSRC) OBUs of the externally located type that already comprise a DSRC radio interface, and for (GNSS) OBUs of the self-locating type that additionally comprise a DSRC radio interface for control and setting purposes.

The number of control units may be considerably higher than that of marking vehicles, in particular may be higher by at least a power of ten.

In some embodiments, upon receipt of a marker, the on-board unit periodically broadcasts the position messages only over a limited period of time, or only for a limited number of position messages. This will prevent violating vehicles that are not picked up within an acceptable time frame from incessantly continuing to broadcast the position messages thereof.

The violations detected by the marking vehicle can include all types of toll or traffic violations that can be automatically detected, for example speeding violations detected by means of a speed measuring unit of the marking vehicle, bans on driving (including time-based bans) detected by means of a vehicle detection unit of the marking vehicle, and the like. The violations may be toll violations, and in particular such which can be ascertained based on a toll parameter that can be read out from the on-board unit via the DSRC radio interface. Such toll parameters can be of any arbitrary type and can, for example, provide information about the deployment purpose of the vehicle (for example emergency vehicle, means of public transportation, private vehicle, truck and the like), the status of the user of the vehicle, about the size, weight, emission class, number of axles of the vehicle, and the like. Any time a toll is calculated, be it during communication with a toll beacon or the calculation of toll transactions from reported positions, the toll parameters of the OBU are employed so as to determine the amount of the toll—or whether an obligation to pay the toll even exists.

An embodiment of a system or method may be characterized in that the detection in the marking vehicle takes place in that at least one toll parameter is read out from the on-board unit via the DSRC radio interface and the toll parameter is checked for accuracy.

In still further embodiments, the system may check vehicle shape-specific toll parameters. Such vehicle shape-specific parameters, which determine the amount of a road toll to be paid, can be, for example, the dimensions of the vehicle, the current number of axles (with or without trailer), a particular body design such as a truck or passenger car, and the like, and can be set or stored as toll parameters in an on-board unit. So as to detect abusive faulty settings of such toll parameters, the marking vehicle comprises a sensor, such as a laser rangefinder or a laser scanner, for detecting a shape parameter of a vehicle carrying the on-board unit, and ascertains the accuracy of the toll parameter depending on the shape parameter.

In those embodiments in which the detection of a violation in the marking vehicles is based on checking the toll parameters set in the on-board units, according to a further characteristic of other embodiments the toll parameter can also be read out by the control unit from the on-board unit via the DSRC radio interface as part of the detection of a violating vehicle by the control unit, provided the position indicated in a position message that is received by the control unit is within the range of the DSRC radio interface of the control unit, and can be displayed in the control unit, so as to allow renewed checking or validation of the toll parameter and of the toll violation.

On-board units marked as having committed a violation can broadcast the position messages thereof in a wide variety of ways. According to a first embodiment, the on-board units broadcast the position messages via the DSRC transceiver thereof, so that they can be received, for example, by DSRC radio beacons on the way, or directly by the control units via the respective DSRC transceiver of the same. Because of the limited range of the DSRC radio interface, the control units can detect passing violating vehicles simply based on the fact that the position messages were successfully received via the DSRC radio interface, and thus track them down or localize them.

In an alternative embodiment, the on-board units transmit the position messages thereof via a mobile communication network (public land mobile network, PLMN), for example a GSM, UMTS or LTE network, to a back office, which forwards the position messages to the control units. Based on the respective positions indicated in the position messages, these control units can then localize and detect the violating vehicles.

In further embodiments, when the marking vehicle transmits a marker, it can additionally transmit a violation message via a mobile communication network to the back office for further checking and/or archiving. The violation messages can also be forwarded by the back office to the control units and used in the control units to cross-check read-out toll parameters.

In a further embodiment, violation messages that are received at the back office can also be used to return a confirmation message for every violation message that is received via the mobile communication network to the on-board unit cited in the violation message. The on-board unit can then be configured to await such a confirmation message before periodically broadcasting the position messages. As a result, system security can be increased and, for example, additional authorization verifications can be carried out at the back office.

If the on-board unit has not received a confirmation message for a marker within a predetermined waiting period, the on-board unit may ignore the received marker, so that the position messages are then not broadcast.

In any case, it may be desirable in some embodiments if the broadcasting of the position messages can be deactivated in the on-board unit at any time by the back office via the mobile communication network, so as to be able to centrally intervene in the event of malfunctions.

In a further embodiment in which the control unit is a control vehicle, this vehicle can be equipped with a unit for determining the vehicle's own position, such as a satellite navigation receiver, and can register the position thereof with the back office, so as to receive only violation messages that relate to the vehicle's vicinity from the back office. This way an additional security step can be implemented for the system in accordance with some embodiments by requiring that a corresponding violation message must be present at the back office for OBUs marked as having committed a violation, wherein the control units cross-check the message before a violation is enforced for the vehicle of a violating OBU that is picked up.

Yet another security verification step can be implemented by equipping the marking vehicle with a read unit for a license plate number of a vehicle carrying the on-board unit and adding the license plate number to the violation message, wherein the control unit likewise comprises a read unit for the vehicle license plate number and uses this number to select the violation message for the cross-check.

According to a further characteristic of the invention, the marking vehicle can also be equipped with a unit for measuring the speed and driving direction of a passing vehicle and can add these measured values to the marker and/or the violation message so as to facilitate the validation of the violation.

BRIEF DESCRIPTION OF THE FIGURES

Additional characteristics of the systems and methods described herein will be apparent from the following detailed description, which reference the accompanying drawings, in which.

DETAILED DESCRIPTION

Figure 1:
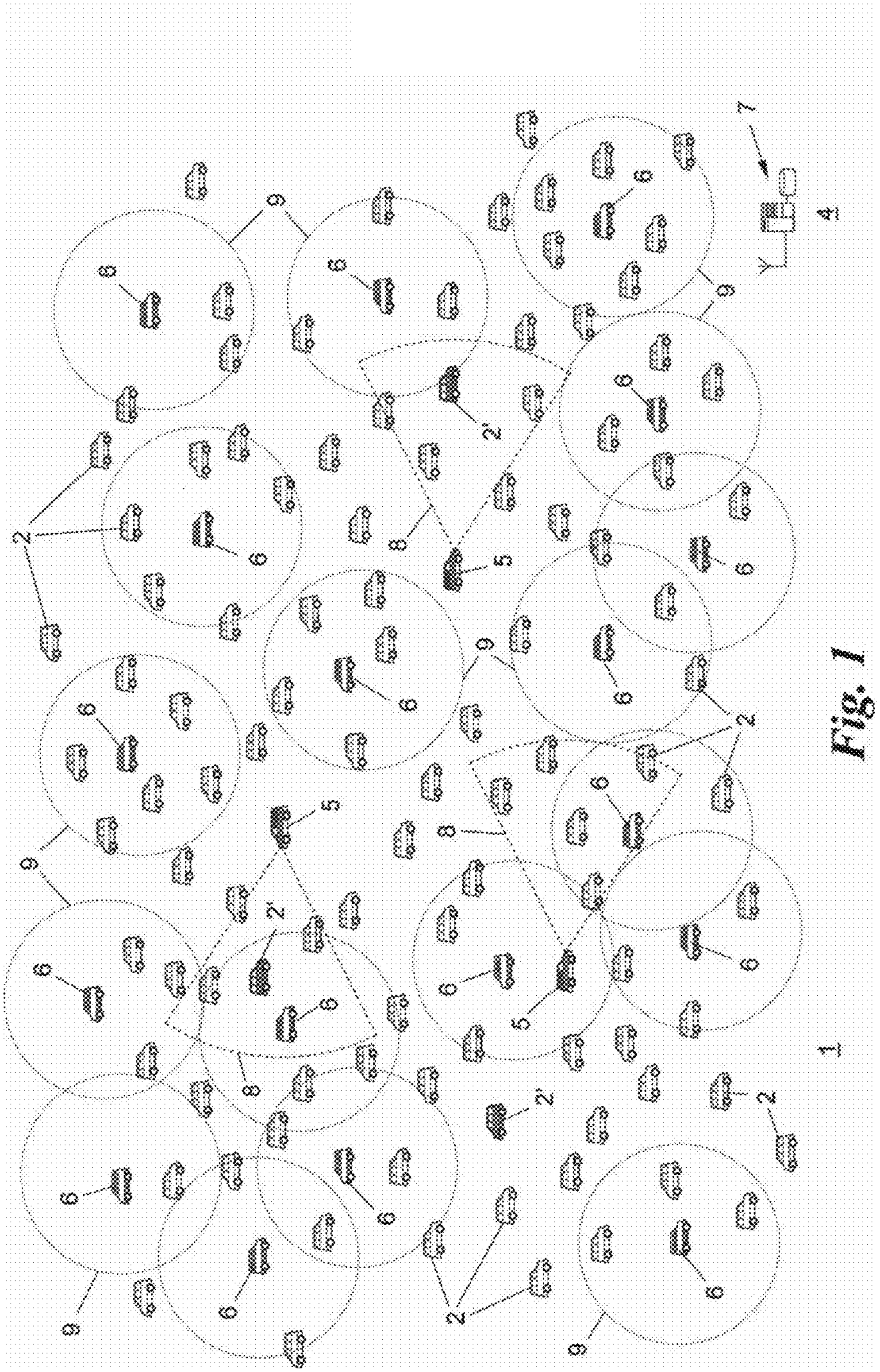
FIG. 1 shows a schematic overview of the operating principle of the control devices and of the control method according to an embodiment in a vehicle population of a road system.

FIG. 1 is a schematic illustration of a road toll system 1, in which a plurality of vehicles 2 that are subject to tolls move about on a road system, which is not shown in detail, for example a nationwide road system. The road toll system 1 is used to charge tolls (fees) for arbitrary road usages by the vehicles 2, and more specifically both usages of traffic areas of moving traffic in form of roadway, territory, passage or border tolls, and of traffic areas of stopped traffic in form of visitation or parking fees.

Figure 5:
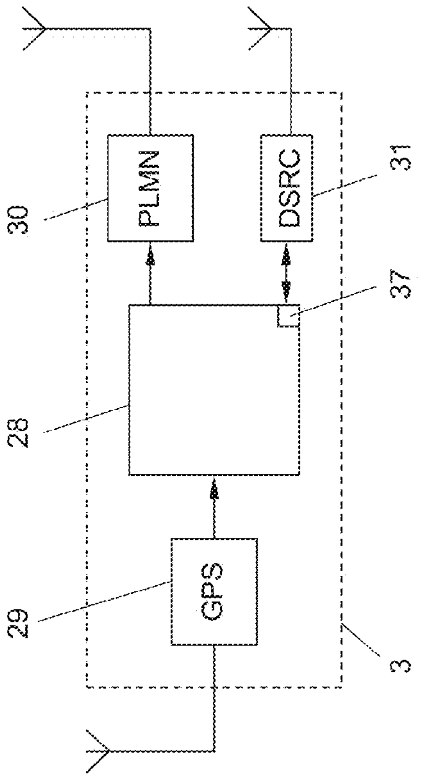
FIG. 5 is a block diagram of an on-board unit according to one embodiment.

For this purpose, according to FIGS. 2, 3 and 5 all vehicles 2 that are subject to tolls are equipped with on-board units (OBUs) 3, which can be used to locate the vehicles 2 and consequently they can be charged tolls. The OBUs 3 can take on a variety of designs: The OBUs 3 can be of the "self-locating" type, which is to say, they can continually determine the locations thereof themselves, for example by means of a satellite navigation receiver 29 (FIG. 5) as part of a satellite navigation system (global navigation satellite system, GNSS) and report the locations thus determined ("position fixes") either directly to a back office 4 of the road toll system 1, be it via a mobile communication network or a network of geographically distributed radio beacons, or in the form of "abstracted" toll transactions, which are calculated based on the reported positions. As an alternative, such GNSS OBUs 3 could simply store the reported positions or toll transactions thereof, or debit the fees calculated based thereon from an internal toll credit account. The OBUs 3 can also be of the "externally located" type, for example using a plurality of toll or radio beacons which are geographically distributed over the road toll system 1 and which establish the respective short range communication or DSRC (dedicated short range communication) with passing OBUs 3 and localize them with respect to the known beacon locations thereof due to the limited communication range. Corresponding reported positions, or toll transactions calculated based thereon, can then be generated by the OBUs 3 or the toll beacons and processed either in the OBUs 3 or in the back office 4.

So as to correctly calculate the toll in the road toll system 1, one or more toll parameters OC that are specific to the respective vehicle 2 are set or stored in the OBUs 3. The toll parameters OC can be of any arbitrary type and can, for example, provide information about the deployment purpose of the vehicle 2 (for example emergency vehicle, means of public transportation, private vehicle, truck and the like), the status of the user of the vehicle 2, about the size, weight, emission class, number of axles of the vehicle 2 with or without trailer, and the like. Any time a toll is calculated, be it during communication with a toll beacon or the calculation of toll transactions from reported positions, the toll parameters OC of the OBU 3 are employed so as to determine the amount of the toll—or whether an obligation to pay the toll even exists.

In another example, toll parameters OC that are considered include in particular those which can be validated (cross-checked) by checking the exterior appearance, which is to say the shape of the vehicle 2 which carries the OBU 3. Such toll parameters OC are referred to herein as vehicle shape-specific. Vehicle shape-specific toll parameters OC can, for example, include one or more dimensions of the vehicle 2, the body design thereof (boxy body, platform body, passenger car or truck body), number of axles, number of trailers, and the like.

The control devices and methods described hereafter are suitable in particular for those OBUs 3, the vehicle shape-specific toll parameters OC of which set or stored therein can be read out via a DSRC radio interface 31 (FIG. 5), as is the case, for example, with DSRC OBUs according to the RFID, CEN-DSRC, UNI-DSRC, ITS-G5 or WAVE (wireless access in a vehicle environment) standards. GNSS OBUs 3, which additionally contain a DSRC radio interface 31 for read-out of the toll parameters thereof for control purposes, are also suited and can be checked in the manner described below.

Moreover, the control devices and methods described herein are, of course, also able to ascertain whether a vehicle 2 that is subject to toll is even equipped with an OBU 3 and—since the read-out of toll parameters requires a correctly functioning OBU 3—check the functionality of an OBU 3.

Finally, the described control devices and methods are also able to detect and enforce general traffic violations of the vehicles 2, such as speeding violations, transgressions of (night) driving bans and other traffic offenses, insofar as they can be automatically detected by means of measuring units, sensors and the like.

A control device is used in the road toll system 1 for the aforementioned control purposes, which is composed of a first fleet of marking vehicles 5, the aforementioned OBUs 3, a second fleet of control units (here: control vehicles 6), and, in some embodiments, a violation server 7 in the back office 4. Instead of, or in addition to, the mobile control vehicles 6, it is also possible to provide stationary control units, for example toll or border stations. The description provided below with respect to control vehicles 6 applies to all types of control units.

In some embodiments a considerably higher number of control vehicles 6 than marking vehicles 5 is provided. The ratio of the number of control vehicles 6 to marking vehicles 5 may be at least 10:1, and possibly 100:1, 1000:1 and more. As will be described below, control vehicles 6 have a simpler design than marking vehicles 5 and are operated with a different movement behavior, which results in a balanced coverage ratio of the spheres of action of marking and control vehicles at minimal costs. The marking vehicles 5 move continually in flowing traffic, and the interactions thereof with the vehicles 2 to be controlled are brief, while the control vehicles 6 can be used both in mobile and in stationary fashion and have longer interactions with the vehicles 2 being controlled if they conduct stop checks or enforce toll violations.

As is shown in the overview in FIG. 1, the marking vehicles 5 are used to detect vehicles 2 that commit a traffic or toll violation, for example a speeding violation, or that contain a faulty or incorrectly set OBU 3, or none at all, which hereinafter are referred to as violating vehicles 2', in the respectively defined detection ranges 8, and to electronically "mark" the OBUs 3 of these vehicles via the DSRC radio interface, as will be described in more detail hereafter based on FIGS. 2, 4 and 5. The control vehicles 6 are used to check violating vehicles 2' that are located in the respective surroundings 9 based on the position messages that are broadcast by the OBUs 3, as will be described in more detail hereafter based on FIGS. 3 and 7.

The crew of the control vehicle 6 can then take the appropriate further verification and enforcement measures, for example stop the violating vehicle 2', conduct a traffic check, charge a subsequent toll, impose a fine and the like.

In addition to the DSRC radio interfaces between the marking vehicles 5 and the OBUs 3, and between the OBUs 3 and control vehicles 6, the marking vehicles 5 and/or the OBUs 3 and/or the control vehicles 6 can be connected to each other and/or to the back office 4 via a wireless network, for example a mobile communication network, in particular a GSM, UMTS or LTE network, and maybe via packet-switched connections. As an alternative, the system may utilize a network of geographically distributed radio beacons in the road toll system 1, for example a DSRC radio beacon, via which the marking vehicles 5, OBUs 3 and control vehicles 6 communicate.

Figure 2A:
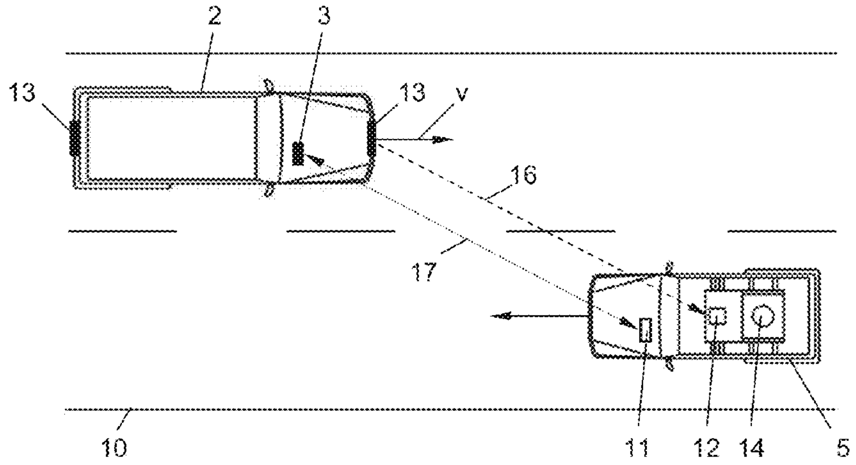
FIGS. 2*a* and 2*b* show different device components and method steps when a vehicle to be controlled passes a marking vehicle.
Figure 2B:
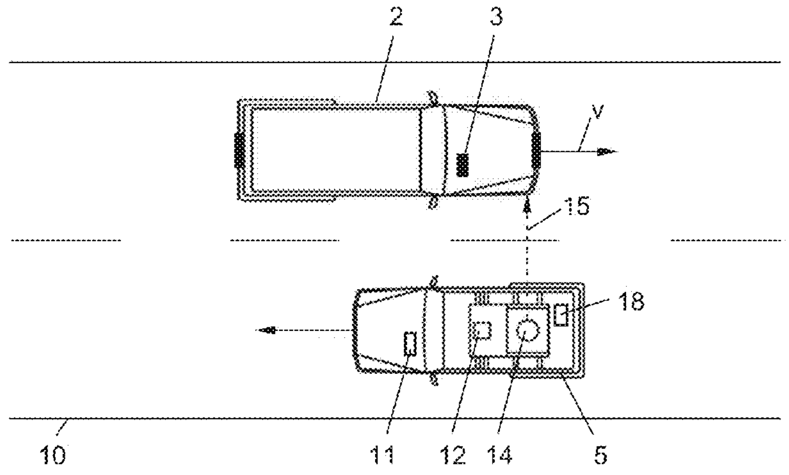

FIGS. 2*a* and 2*b* show one of the marking vehicles 5 in detail at two consecutive times as a vehicle 2 on a road 10 passes in opposing traffic. The marking vehicle 5 is equipped with a DSRC transceiver 11 for DSRC radio communication with the OBU 3 of the vehicle 2, a license plate number read unit 12 for automatically reading (optical character recognition, OCR) a license plate 13 of the vehicle 2, and a sensor 14, which here is a laser scanner, for detecting a parameter of the outside shape of the vehicle 2, which hereinafter is referred to as the shape parameter CL.

In the present example, the shape parameter CL is a vehicle class ("passenger car", "truck with two axles", "truck with three axles", "truck with four axles", "truck with trailer", and the like); however, of course any other property of the outside shape of the vehicle 2 which can be determined by way of the sensor 14 can serve as the shape parameter CL, similarly to the aforementioned vehicle shape-specific toll parameter OC.

The sensor 14 for detecting the shape parameter CL can be designed in any manner that is known from the prior art, for example in form of an electronic camera, which can record one or more images of the passing vehicle 2, including from different viewing angles, with these images then being used to extract corresponding properties and shape parameters of the vehicle 2 by means of image recognition software. As an alternative, the sensor 14 can be a light-section sensor, or a radar or laser rangefinder or scanner, which scans the vehicle 2 as it passes using a light, radar or laser beam or fan 15 so as to detect one or more dimensions or contours of the passing vehicle 2 in form of a scanning profile or a scanning point cloud.

The license plate number read unit 12 of the marking vehicle 5 carries out an OCR read process known from the prior art of an official license plate number LPN on the license plate 13 of the vehicle 2 ("automatic license plate number recognition", ALNR); the imaging path or information flow is shown schematically with the arrow 16.

The DSRC transceiver 11 of the marking vehicle 5 establishes DSRC radio communication 17 with the OBU 3 so as to read out the toll parameter OC set or stored in the OBU 3 for the further examination. During this examination, the read-out toll parameter OC of the OBU 3 should be consistent with the shape parameter CL of the vehicle 2 detected by the sensor 14. For example, if the toll parameter OC indicates "three-axle truck", the sensor 14 should also detect a shape parameter CL that is consistent therewith; if not, a toll violation exists and the vehicle 2 is a violating vehicle 2'.

Of course, a toll parameter OC that is read out from the OBU 3 can additionally be dependent on components other than the vehicle shape, for example the status or usage purpose of the vehicle 2, the time, the general temporal conditions (for example night driving ban), vehicle emission class restrictions, speeds, and the like, which can likewise be taken into consideration when checking the violation.

In addition, the marking vehicle 5 can also ascertain violations other than toll violations, for example general traffic violations of a vehicle 2, for example speeding violations. To this end, the marking vehicle 5 can be equipped with a unit 18 for measuring the speed and the driving direction, which is to say the movement vector v, of a vehicle 2. The measuring unit 18 can also be implemented by a license plate number read unit 12 which is designed as a video camera and in the images of which movements can be detected, or by a DSRC transceiver 11 designed as a Doppler radar, or by appropriate measurements using the sensor 14, for example laser or LIDAR measurements on the scanning beam or fan 15.

All components, these being the DSCR transceiver 11, license plate number read unit 12, sensor 14, and measuring unit 18, of the marking vehicle 5 are connected to each other—via a controller in some embodiments (not shown)—and the recording vehicle 2 can, as described, communicate with the back office 4 or the violation server 7 wirelessly via a communication unit (not shown).

The operating principle of the marking vehicle 5 and the marking process that takes place when a vehicle 2 passes according to one embodiment will now be described in more detail with reference to FIGS. 2 and 4*a* for a vehicle shape-specific toll violation. When the vehicle 2 approaches the marking vehicle 5, in a first step 19 the license plate number LPN of the vehicle 2 is read from the license plate 13 using a license plate number read unit 12 (arrow 16). The step 19 can also be carried out at any later time of the method of FIG. 4, as long as the license plate number read result LPN is not yet required, for example this can be done at a later time by reading the rear license plate 13 of the vehicle 2.

Subsequently, in a step 20, the shape parameter CL of the vehicle 2 is detected by way of the sensor 14, in the example shown this is done by laser scanning and detecting the number of axles of the vehicle 2, based on which an axle-based vehicle class ("class") is determined as the shape parameter CL.

In a subsequent decision step 21, it is checked based on the shape parameter CL whether or not the vehicle 2 is even subject to tolls. Two-axle vehicles 2, for example, can be defined as not being subject to tolls, and vehicles 2 with more than two axles can be defined as being subject to tolls. If the shape parameter CL indicates an obligation to pay tolls (branch "y"), in the subsequent step 22 contact is established with the OBU 3 using the DSRC transceiver 11 (arrow 17). The toll parameter OC is read out from the OBU 3 for this purpose, and a successful read-out also indicates that the OBU 3 is present and functioning. The subsequent decision step 23 then switches directly to step 40 for generating a violation message DLM 39 if the read-out fails (branch "n").

Otherwise (branch "y" of step 23), it is checked in the further decision 24 whether the detected shape parameter CL and the read-out toll parameter OC match or are consistent with each other, which is to say the toll parameter OC of the OBU 3 is set such that it corresponds to the shape parameter CL that has been detected based on the outside shape of the vehicle 2. If so (branch "y"), everything is fine and the method ends at 26. If not (branch "n"), an inconsistency exists, which constitutes a potential toll violation, and the process switches to step 25 for marking the OBU 3 as a "violating OBU" of a "violating vehicle" 2'.

Of course steps 19 to 24—provided they do not require each other—can also be carried out in a different order.

In the marking step 25, a marker (MRK) 27 is transmitted from the marking vehicle 5 via the DSRC radio interface 17 between the DSRC transceivers 11 and 31 to the OBU 3 of the vehicle 2. The processing of the marker 27 in the OBU 3 will be described in more detail based on FIGS. 5 and 6.

According to FIG. 5, the OBU 3 comprises a processor 28, the satellite navigation unit 29, for example a GPS receiver, a communication module 30 for a mobile communication network, and the DSRC transceiver 31. The satellite navigation receiver 29 can be eliminated in the case of externally located DSRC OBUs 3. The mobile communication network communication module 30 may be present in some embodiments, and omitted in others.

Figure 6:
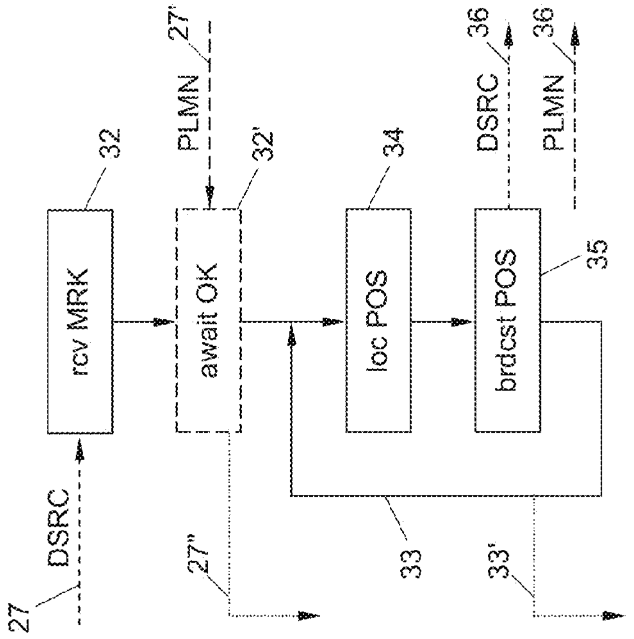
FIG. 6 is a flow chart of the part of the method that takes place in the on-board unit.

According to FIG. 6, the marker 27 is received in the OBU 3 in a first step 32. Upon receipt of the marker 27, the OBU 3 starts with a loop process 33, within the scope of which it continually—for example at regular or irregular intervals—determines its own position POS in a step 34, and broadcasts the same in a step 35 as a position message 36, specifically via the DSRC transceiver 31. As an alternative or in addition, the position message 36 could also be sent via a mobile communication network using the mobile communication network communication module 30, and more specifically to the violation server 7 of the back office 4 or, in some embodiments, also to control vehicles 6.

The marker 27 thus basically sets a "flag" 37 in the OBU 3, which marks the same as a "violating OBU" and prompts it to continually emit position messages 36 containing its own position POS.

The loop process 33 may be carried out only over a limited period of time, for example a few ten minutes or several hours, or only for a limited number of passes, so that position messages 36 are broadcast only over this period of time or in this number.

Figure 4A:
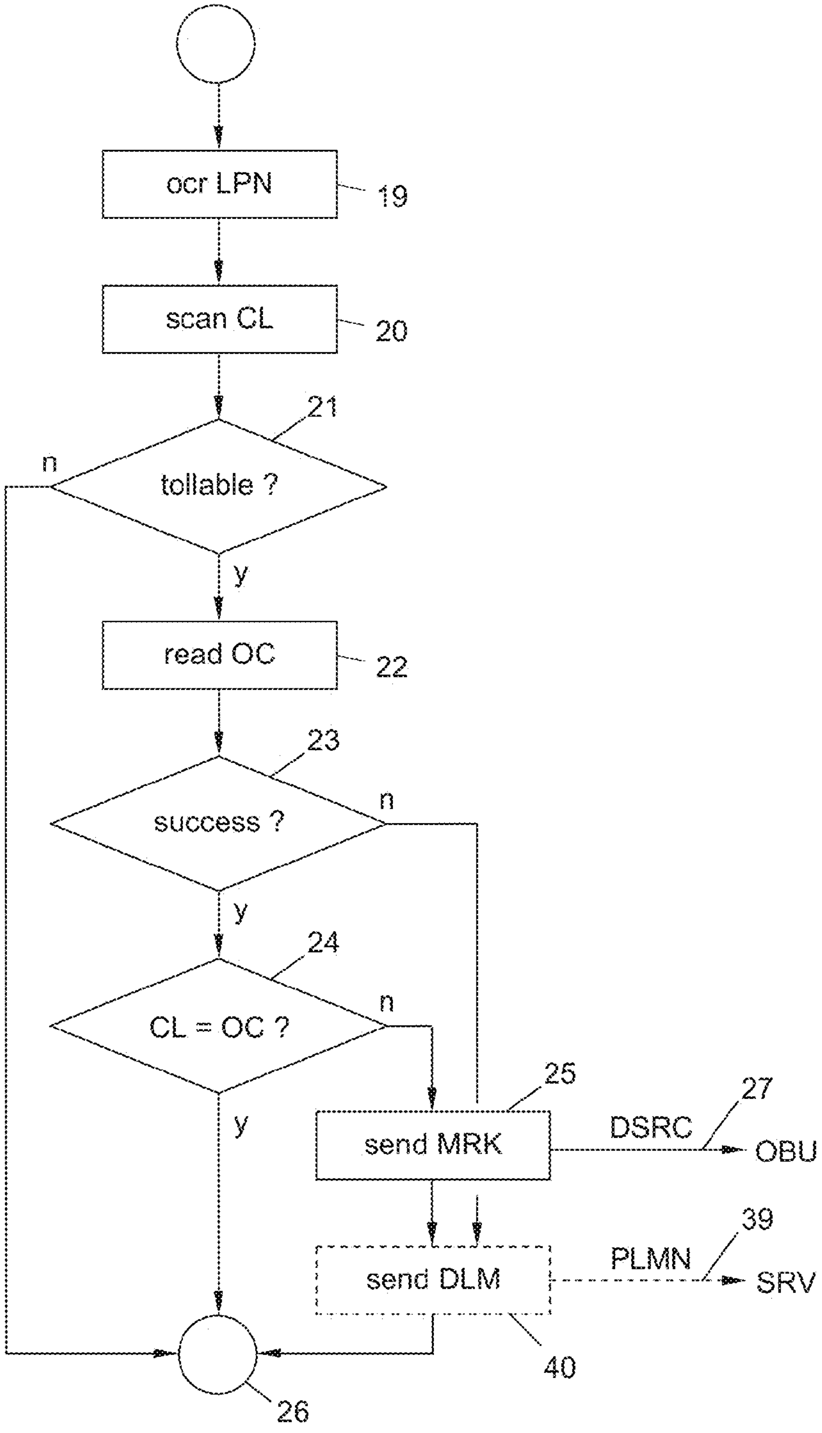
FIGS. 4*a* and 4*b* are flow charts of two different embodiments of the part of the method that takes place in the marking vehicle.
Figure 4B:
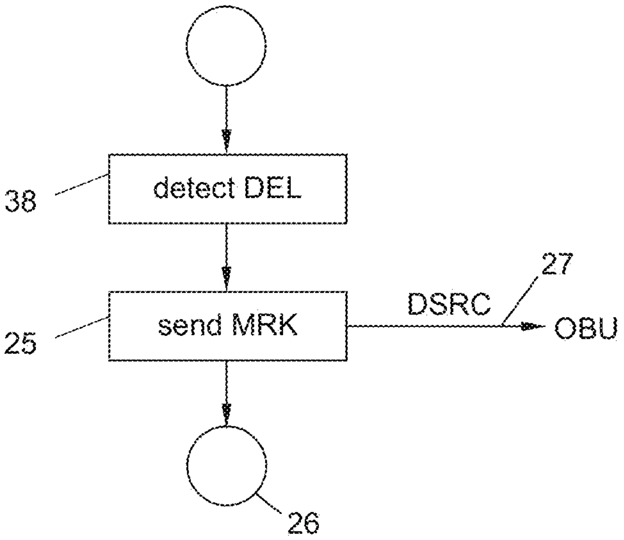

FIG. 4*b* shows a simplified variant of the method in the marking vehicle 5, for example for detecting general traffic violations. In a general first step 38, a violation of the vehicle 2 is detected, for example a toll offense as described in FIG. 4*a*, or a speeding violation, for example by way of the measuring unit 18 of the marking vehicle 5. In the subsequent step 25, the marker 27 is transmitted via the DSRC radio interface 17 to the OBU 3, which starts the broadcast loop 33 (FIG. 6).

Coming back to FIG. 4*a*, in a step 40, the marking vehicle 5 can, in some embodiments, in addition to the marker 27, also broadcast a violation message ("delict message", DLM) 39 to a back office 40, or more particularly to the violation server 7, possibly via a mobile communication network. The violation message 39 contains data about the violation, for example the speed of the vehicle, the detected shape parameter CL, the read-out toll parameter OC and/or the license plate number read result LPN, as well as, in some embodiments, additional data, such as the current location ("location of the violation") DO and the current time ("time of the violation") DT of the marking operation, additional master data read out from the OBU 3, such as the OBU identifier OID, user master data, vehicle master data, and the like.

The location of the violation DO can be determined in a wide variety of ways: The marking vehicle 5 can be equipped with a separate position determination unit, for example a satellite navigation receiver, and record the current location of the vehicle's passage as the location of the violation DO. As an alternative, the OBU 3, in particular if it is of the self-locating type, can make the current position POS thereof, determined by the satellite navigation unit 29, available to the recording vehicle 5 as the location of the violation DO. The known locations of neighboring radio beacons of a beacon-based road toll system 1 can also be used for approximation.

The violation message 39 is subsequently made available by the violation server 7 to the control vehicles 6 for additional review purposes, as will be described in more detail hereafter. The back office 4, or the violation server 7 thereof, can return a confirmation message 27' (FIG. 6), for example for every violation message 39 that is received, to the OBU 3 mentioned in the violation message 39—for example referenced by way of the OBU identifier OID—via the mobile communication network. During a waiting step 32' provided upstream of the loop process 33, the OBU 3 can then await the arrival of such a confirmation message 27'.

In addition, if no such confirmation message 27' arrives from the back office 4 within a predetermined waiting period in the waiting step 32', the marker 27 previously received in step 32 can be ignored, which is to say the broadcasting of the position messages 36 is eliminated (arrow 27").

In addition, some embodiments may be configured so as to suppress the broadcasting of the position messages 36 of an OBU 3 at any time by the back office 4, for example by way of a corresponding abortion message, which the back office 4 transmits via the mobile communication network to the OBU 3, whereupon the same aborts the loop process 33 (arrow 33').

Figure 3A:
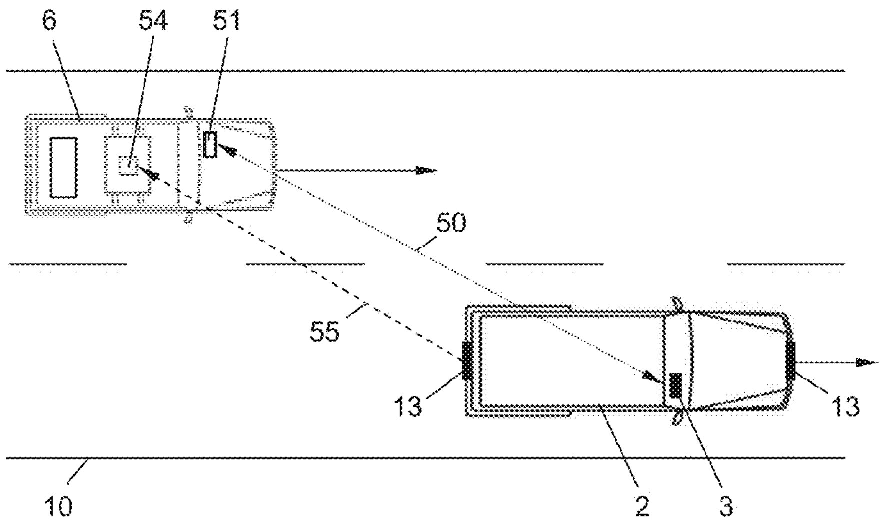
FIGS. 3*a* and 3*b* show different device components and method steps when a vehicle to be controlled passes a control unit.
Figure 3B:
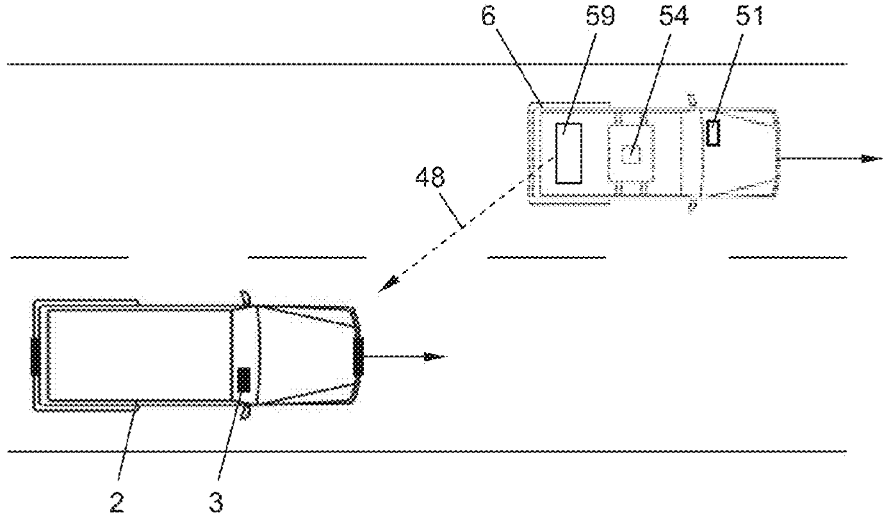

The steps that take place in the violation server 7 and an exemplary control vehicle 6 will be described based on FIGS. 3 and 7*a*. FIGS. 3*a* and 3*b* show the situation as a control vehicle 6 passes a vehicle 2 at two consecutive times. In preparation for (or during) such a check, the violation server 7 can selectively provide the control vehicles 6 with those violation messages 39 that originate from violations in the respective surroundings 9 thereof.

For this purpose, every control vehicle 6 registers with its own position LOC in the violation server 7 during a registration phase 41. The current position LOC of the control vehicle 6 can be autonomously determined by the same, for example, in a position determination step 42, such as with the aid of a satellite navigation receiver, based on information from neighboring beacons, or the like. As an alternative, the position LOC can also be manually entered by the user in an input unit of the control vehicle 6 in step 42.

During the subsequent registration step 43, the control vehicle 6 registers with the position LOC thereof in the violation server 7, which opens a dedicated task 44 for every registered control vehicle 6.

Using the task 44, the violation server 7 can "filter" (phase 45) all violation messages 39 that have arrived in step 40, and those that arrive thereafter, in a location-specific manner. For this purpose, the violation server checks whether the location of the violation DO of a violation message 39 is within the surroundings 9 of the position LOC of a control vehicle 6, and if so, it makes this violation message 39 available to this control vehicle 6 (step 46). The control vehicle 6 includes the violation messages 39 provided with in this way in a local violation message list locDLM 47.

The provision of the violation messages 39, which have been filtered in a location-specific manner, in step 46 can take place both continually, for example periodically or as needed, for example in that the violation server 7 transmits each individual violation message 39 to the control vehicle 6, or in batches (using batch processing), in that the control vehicle 6 picks up the violation messages 39 that are provided at a particular time from the violation server 7, or receives them transmitted from the server.

In embodiments with the time of the violation DT, the violation messages 39 also bear a respective "time stamp", which can limit the temporal validity of the messages. For example, violation messages 39 that are "too old", which is to say those having time stamps DT that are outside a predetermined time period, can be automatically discarded, both in the violation server 7 and in the control vehicle 6, and/or the violation server 7 can make available only "current" violation messages 39 to a control vehicle 6, which is to say those having time stamps DT that are within a predetermined time period.

During the registration phase 41, the control vehicles 6 thus basically "subscribe to" violation messages 39 from the surroundings 9 thereof, until, in a step 48, they transmit a deregistration request to the violation server 7, whereupon the same deletes the task 44.

The control vehicles 6 are thus provided with the respective current and location-specific violation messages 39 from the surroundings 9 thereof and can, when a vehicle 2 passes or is checked, carry out control tasks 49 which utilize the respective local violation message list 47.

Figure 7B:
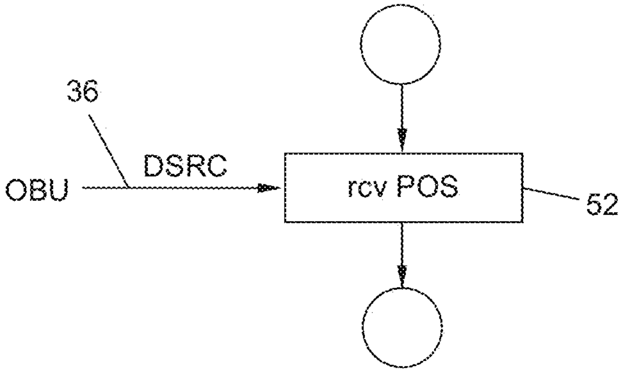
FIG. 7*b* is a flow chart of an alternative embodiment of the part of the method that takes place in the control unit.
Figure 7A:
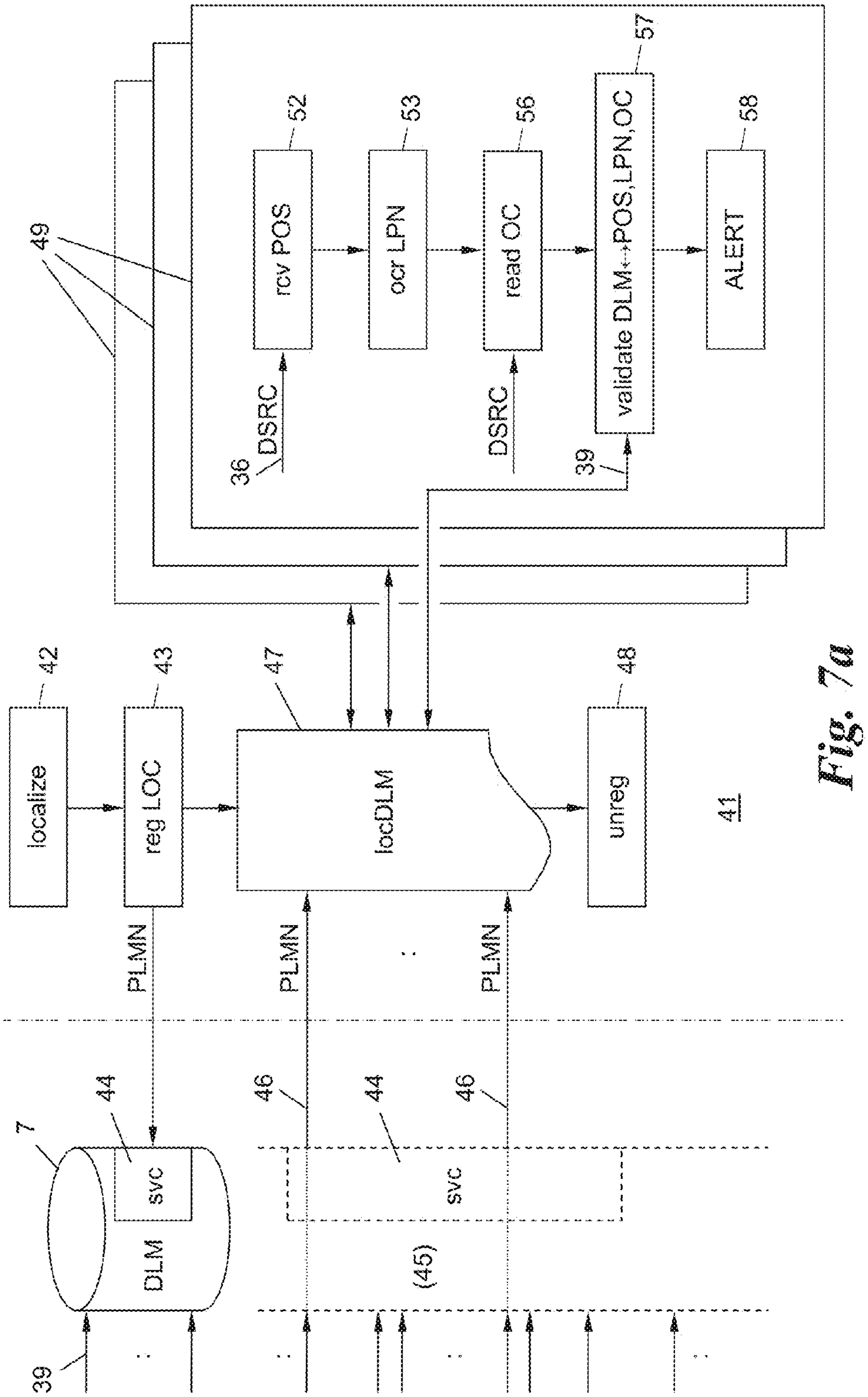
FIG. 7*a* is a flow chart of a first embodiment of the part of the method that takes place at the back office and in the control unit.

According to FIGS. 3 and 7*a*, during every control task 49, in a first step 52, a position message 36 of the OBU 3 is intercepted every time a violating vehicle 2' enters the DSRC range of the DSRC radio interface 50 between the DSRC transceiver 31 of the OBU 3 and the DSRC transceiver 51 of the control vehicle 6. Thereafter, in step 53, the license plate number LPN of the license plate 13 of the violating vehicle 2' is read out using a license plate number read unit 54 of the control vehicle 6 (arrow 55). In the step 56 of some embodiments, the OBU 3 can continue to be read out via the DSRC radio interface 50, for example the toll parameter OC thereof, OBU identifier and the like. Steps 52, 53 and 56 can also be carried out in a different order. In embodiments that include the step 57, violation messages 39 of the surroundings 9 are checked from the local violation message list 47 as to whether the position POS and/or the license plate number LPN of the violating vehicle 2' appear therein, so as to validate the violation.

If a violation exists, the control vehicle 6 issues a corresponding alert 58 to its crew. The alert message 58 can, for example, be an optical or acoustic alert, or a display on a screen, which also indicates the read license plate number LPN and the violation message DLM 39. The crew can then take appropriate enforcement measures, for example stop the violating vehicle 2', further check the OBU 3, and in some embodiments, may levy a subsequent toll or impose a fine. The alert message 58 can additionally be automatically displayed on a signaling unit 59 of the control vehicle 6 which is outwardly visible for the violating vehicle 2' (arrow 60), so as to prompt the same to stop, for example, using fluorescent lettering "STOP".

In some embodiments, the violation server 7 can be equipped with estimation algorithms, which carry out an estimation of the temporal changes of the locations of the violations DO (as the "last whereabouts" of the violating vehicles 2'), based on speeds and driving directions of the vehicles 2 that were measured by the unit 18 when the violation was marked.

The movement vector v of the vehicle 2 at the time of the violation DT can be integrated in the violation message 39 and transmitted to the violation server 7. The violation server 7 can then extrapolate or estimate potential new whereabouts DO of the vehicle 2 for later times, also with the support of road system maps of the road system, and take this into consideration during phase 45 for those times at which the violation messages 39 that are relevant for the surroundings 9 of a control vehicle 6 are selected. Violation messages 39 of vehicles 2, the locations of violations DO of which were formerly outside the surroundings 9 of the position LOC of a control vehicle 6, can thus be in the surroundings 9 at a later time—on an extrapolated basis—and thus be made available to this control vehicle 6, or to the local violation message list 47 thereof.

FIG. 7*b* shows a simplified embodiment of the method, which can take place in a control vehicle 6 or in a task 49 thereof. In this simplified variant, the control vehicle 6 directly receives, in step 52, the position message 36 of the OBU via the DSRC radio interface 50 between the DSRC transceiver 51 of the vehicle and the DSRC transceiver 31 of the OBU 3. Because of the limited range of the DSRC radio interface 50, the successful receipt of a position message 36 also indicates a close geographical proximity to the violating vehicle 2', so that the same—provided the traffic density is not too high, which could mean that several violating vehicles 2' could enter the radio coverage range of the DSRC radio interface 50—is localized and found. When using appropriate guidelines for the DSRC transceiver 51 of the control vehicle 6, the DSRC radio coverage range, and thus the track-down surroundings 9 of the control vehicle 6, can be narrowed further, whereby the violating vehicle 2' can be clearly localized and detected as a result of receipt of a position message 36.

The invention is thus not limited to the shown embodiments, but encompasses all variants and modifications that are covered by the scope of the accompanying claims.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the systems may be implemented using a general purpose or dedicated processor device running a software application or program code stored in volatile or non-volatile memory devices. Devices so programmed may be used to perform the methods described herein. Also, the hardware objects could communicate using electrical signals, with states of the signals representing different data.

It should be further understood that these and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A control device for a road toll system based on on-board units carried by vehicles, comprising:

at least one marking vehicle, at least one on-board unit, and at least one control unit, each comprising a dedicated short range communication (DSRC) transceiver for establishing a DSRC radio interface, wherein the marking vehicle is configured to detect a traffic or toll violation of an on-board unit, or of a vehicle carrying the same, and, if a violation exists, to transmit a marker to the on-board unit via the DSRC radio interface, wherein the on-board unit is configured to determine the position thereof and, upon receipt of a marker, to periodically broadcast position messages containing the respective current position thereof, and wherein the control unit is configured to detect the vehicle based on at least one of the position messages broadcast by the on-board unit.

2. The device according to claim 1, wherein the marking vehicle is configured to read out at least one toll parameter from the on-board unit via the DSRC radio interface, check the toll parameter for accuracy and, if it is incorrect, to transmit the marker to the on-board unit via the DSRC radio interface.

3. The device according to claim 2, wherein the toll parameter is vehicle shape-specific, and the marking vehicle comprises a sensor for detecting a shape parameter of a vehicle carrying the on-board unit and ascertains the accuracy of the toll parameter depending on the shape parameter.

4. The device according to claim 2, wherein the control unit is configured to receive a position message and, if the position indicated therein is within the range of the DSRC radio interface, to read out the toll parameter from the on-board unit via the DSRC radio interface and display it.

5. The device according to claim 1, wherein the control unit is a control vehicle.

6. The device according to claim 1, wherein the on-board unit is configured to broadcast position messages via the DSRC transceiver thereof, and the control unit is configured to receive position messages via the DSRC transceiver thereof.

7. The device according to claim 1, wherein the marking vehicle is configured to additionally transmit a violation message via a mobile communication network to a back office when transmitting a marker, and the control unit is configured to receive violation messages from the back office and counter-check read-out toll parameters against them.

8. The device according to claim 7, wherein the control unit is a control vehicle and the control vehicle is equipped with a unit configured to determine the position thereof and configured to register the position with the back office so as to receive only violation messages that relate to the surroundings of the control vehicle from the back office.

9. The device according to claim 7, wherein the marking vehicle comprises a read unit for a license plate number of a vehicle carrying the on-board unit and is configured to add the license plate number to the violation message, and the control unit likewise comprises a read unit for the vehicle license plate number and is configured to use this number for selecting the violation message for the cross-check.

10. The device according to claim 1, wherein the marking vehicle is equipped with a unit configured to measure the speed and driving direction of a passing vehicle and configured to add the measured values to the marker and/or the violation message.

11. A control method for a road toll system that is based on on-board units carried by vehicles, using at least one marking vehicle, at least one on-board unit, and at least one control unit, each comprising a dedicated short range communication (DSRC) transceiver for establishing a DSRC radio interface, the method comprising:

in the marking vehicle: detecting a traffic or toll violation of an on-board unit, or of a vehicle carrying the same, and, if a violation exists, transmitting a marker to the on-board unit via the DSRC radio interface;

in the on-board unit: periodically determining, upon receipt of a marker, the position of the on-board unit and broadcasting position messages containing the respective current position thereof;

in the control unit: detecting the vehicle based on at least one of the position messages that are broadcast by the on-board unit.

12. The method according to claim 11, wherein the periodic broadcasting of the position messages in the on-board unit takes place only over a limited period of time or only for a limited number of position messages.

13. The method according to claim 11, wherein the detecting a traffic or toll violation comprises reading out at least one toll parameter from the on-board unit via the DSRC radio interface and checking the toll parameter for accuracy.

14. The method according to claim 13, wherein the toll parameter is vehicle shape-specific and the marking vehicle detects a shape parameter of a vehicle carrying the on-board unit and ascertains the accuracy of the toll parameter depending on the shape parameter.

15. The method according to claim 13, wherein detecting the vehicle comprises receiving a position message, and, if the position indicated therein is located within the range of the DSRC radio interface, reading out the toll parameter from the on-board unit via the DSRC radio interface and displaying the same.

16. The method according to claim 11, wherein the position messages are broadcast via the DSRC radio interface and received by the control unit.

17. The method according to claim 11, wherein the position messages are broadcast by the on-board unit to the control unit via a mobile communication network and a back office.

18. The method according to claim 11, wherein the marking vehicle additionally transmits a violation message to a back office via a mobile communication network when transmitting a marker.

19. The method according to claim 15, wherein the control unit receives violation messages from the back office and cross-checks read-out toll parameters against them.

20. The method according to claim 18, wherein the back office transmits a confirmation message for a received violation message to the on-board unit mentioned in the violation message via the mobile communication network, and the on-board unit awaits such a confirmation message before broadcasting the position messages.

21. The method according to claim 20, wherein the received marker is ignored by the on-board unit if no confirmation message arrives within a predetermined waiting period.

22. The method according to claim 18, wherein the broadcasting of the position messages can be deactivated in the on-board unit from the back office via the mobile communication network.

23. The method according to claim 11, wherein the marking vehicle reads a license plate number of a vehicle carrying the on-board unit and adds it to the violation message, and the control unit reads the vehicle license plate number and uses it to select the violation message for the cross-check.

* * * * *